Dec. 17, 1935.  E. A. NELSON  2,024,244
METHOD OF MAKING BRAKE DRUM SEAL DEVICES
Filed April 20, 1934
FIG. 2  FIG. 3
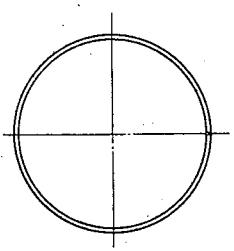
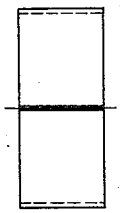
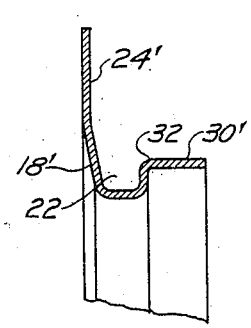
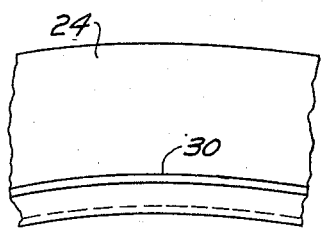
FIG. 4  FIG. 5  FIG. 6  FIG. 7
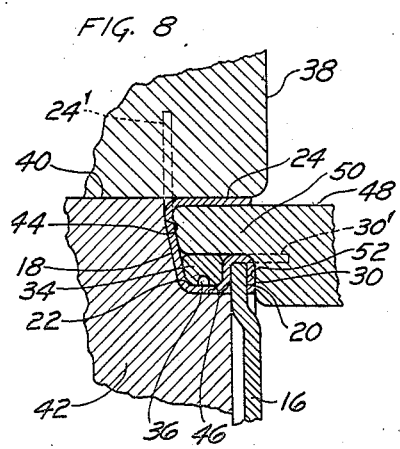
FIG. 8
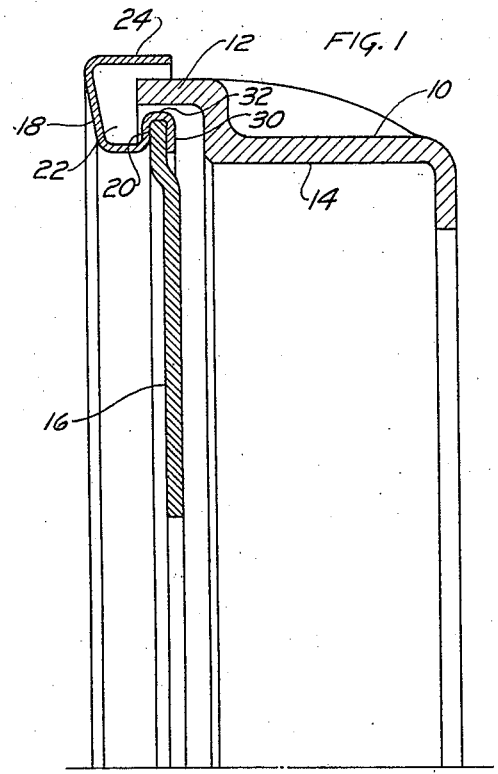
FIG. 1
INVENTOR.
Emil A. Nelson.
BY
Harness, Dickey, Pierce & Hann.
ATTORNEYS.

Patented Dec. 17, 1935

2,024,244

UNITED STATES PATENT OFFICE 2,024,244

METHOD OF MAKING BRAKE DRUM SEAL DEVICES

Emil A. Nelson, Lansing, Mich., assignor to Motor Wheel Corporation, a corporation of Michigan Application April 20, 1934, Serial No. 721,436

12 Claims. (Cl. 29—152.2)

This invention relates to a method of making a brake drum sealing device and assembly and has for its object the provision of a method by the practice of which such device is formed in a simple and economical manner and secured in a simple and inexpensive manner in place to a backing plate.

Further objects are to provide a novel means for forming a sealing device of novel conformation; to provide a novel method of securing a sealing device to a brake drum backing plate; and to provide a novel method of operation wherein a brake drum sealing device is partially formed, and finish formed and secured in place to a backing plate during a single operation.

The above being among the objects of the present invention, the same consists in certain novel steps of operation and combinations of steps to be hereinafter described with reference to the accompanying drawing and then claimed, having the above and other objects in view.

In the accompanying drawing which illustrates a suitable embodiment of an article to which the method of the present invention is applicable, together with various views indicating various steps of operation in the construction of the article.

Figure 1 is a fragmentary sectional view taken axially through a brake mechanism of the type applicable for use in connection with motor vehicles and illustrating only the brake drum and its cooperating backing plate and sealing element.

Fig. 2 is a reduced plan view of a strip of metal forming the initial piece of stock from which the sealing device indicated in Fig. 1 is constructed.

Fig. 3 is an end view of the strip of metal shown in Fig. 2.

Fig. 4 is an end elevational view of the ring which is formed by the initial operation upon the piece of stock illustrated in Figs. 2 and 3.

Fig. 5 is a side elevational view of the ring shown in Fig. 4.

Fig. 6 is a fragmentary sectional view taken through the axis of the ring shown in Figs. 4 and 5, on the same scale as in Fig. 1, and illustrating the form of the ring after a subsequent operation or operations thereon.

Fig. 7 is a fragmentary side elevational view of the ring member in the stage of formation disclosed in Fig. 6.

Fig. 8 is a fragmentary sectional view taken through the axis of the sealing ring and backing plate and showing the general construction of the dies employed for modifying the form of the ring as disclosed in Figs. 6 and 7 to that disclosed in Fig. 1, and the manner of securing the ring to the backing plate.

In my co-pending application for Letters Patent of the United States for improvements in Brake drum sealing device, Number 721,435, filed on even date herewith, a preferred form of sealing element structure and its cooperating backing plate and brake drum is illustrated and described. The present invention deals with a method of constructing a sealing element of the general type disclosed in said co-pending application and to a method of applying a sealing element of such general construction to a brake drum backing plate. Accordingly, in order to illustrate the purposes and use of an article constructed in accordance with the present invention, there is illustrated in Fig. 1 a brake drum having a rim or ring portion 10. In the particular embodiment of the brake drum ring 10 shown its open end is formed to provide an axially extending tongue or ring 12 radially outwardly offset from the braking surface 14 of the rim or ring 10. A backing plate 16, preferably stamped out of a sheet of metal, is disposed within the offset open end of the brake drum ring 10 with its peripheral edge in radially inwardly spaced relation with respect to the radially inner face of the ring portion 12.

The peripherally marginal edge faces of the backing plate 16 are embraced by and support a sealing element indicated generally at 18 which extends into encompassing relation with respect to the offset tongue or ring 12 of the brake drum ring 10 for the purpose of minimizing the entrance of foreign material to the interior of the brake drum. This sealing element is formed from sheet metal to provide a radially inwardly opening channel 20 in which the periphery of the backing plate 16 is closely embraced, and an adjacent radially outwardly opening channel 22, the left hand wall of which, as indicated in Fig. 1, is radially extended outwardly to a point radially beyond the outer surface of the tongue or ring portion 12, where it is provided with an axially inwardly turned leg or flange portion 24 serving to hood the channel 22 and extending into spaced but overlapping relationship with respect to the radially outer surface of the tongue or ring portion 12 of the brake drum. The present invention deals particularly with the formation of the sealing element 18 and its application to the backing plate 16.

In the construction of the sealing element 18 a strip of metal of suitable length, width and thickness as illustrated in Figs. 2 and 3 is first bent into ring-like formation as illustrated in Figs. 4 and 5 with opposite end edges of the strip indicated in Figs. 2 and 3 brought into abutting relationship and welded together in any suitable manner. The ring as thus formed and indicated in Figs. 4 and 5 is then suitably acted upon by suitable forming apparatus and preferably by means of rolling or other operation to bring it to the cross-sectional formation indicated generally at 18' in Fig. 6. As illustrated in Fig. 6 it will be noted that the sealing element in this figure has reached a point of completion identical to that disclosed in Fig. 1 with the exception that the right hand leg or side wall 30 of the channel 20 has not yet been bent into a radial plane but instead is positioned in axially parallel relation and at the same diameter as the bottom 32 of the channel 20, thus forming with the bottom wall of the channel an axially directed flange. That portion of the structure illustrated in Fig. 6 which is to form the wall or leg 30 in the final product is illustrated at 30'. It will also be observed in Fig. 6 that that portion of the sealing ring which is to form the leg or flange 24, illustrated in Fig. 6 at 24', is disposed in a radial plane instead of in the axially directed relation that it will assume in the finished ring 18.

The next operations, which are indicated in Fig. 8, consist in first springing a ring 34 into the channel 22. This ring which is of a section sufficient to completely fill the channel 22 for a depth equal to the channel 20, is of split construction so as to permit it to be inserted into and removed from the channel 22. Preferably, the ring is provided with a radially opening annular channel 36 on its inner face so constructed and arranged as to permit the application of compressed air thereto after the die operation is completed to thereby facilitate its expansion and removal from the sealing ring 18 upon completion of the latter.

The next operation consists in placing the partially formed ring indicated in Fig. 6, with the ring 34 positioned therein, in suitable dies of the type illustrated in Fig. 8 and causing relative movement between the dies to bend the portions 30' and 24' to the positions finally desired as well as to simultaneously cause the peripheral edges of the backing plate 16 to be closely embraced within the channel 20.

These dies as illustrated in Fig. 8 comprise an outer ring or part 38 having a cylindrical opening 40 therein, a cylindrical die part 42 relatively closely received in and slidable within the opening 40 and provided with surfaces 44 and 46 complementary in size and shape to the bottom and left hand side respectively of the walls of the channel 22, and a third and ring-like die part 48. This last die part 48 has a cylindrical outer surface of a diameter to be received within the opening 40 and still provide sufficient clearance between its outer face and the wall of the opening 40 to accommodate the thickness of the metal from which the element 18 is formed. It is provided with an axially extending portion 50 whose inner diameter is such as to receive and closely embrace the bottom wall of the channel 20 when positioned therein and a shoulder 52 which will abut the outer face of the leg 30 of the completed channel 20 when the end of the portion 50 is seated against the complementary inner surface of the left hand leg of the channel 22.

In the operation of these die members to bring the ring 18' indicated in Fig. 6 to the shape indicated at 18 in Fig. 1 with the backing plate 16 embraced at its periphery within the channel 20, the die member 42 is moved relatively to the right as indicated in Fig. 8 until the surface 44 thereof is flush with or positioned outwardly of the right hand face of the die member 38, the member 48 is relatively removed to the right in spaced relation to the die part 42, and the member 18' is thereupon inserted in place in contact with the surfaces 44 and 46 respectively of the die part 42, it being understood that the ring 34 is at this time positioned in place within the channel 22. The backing plate 16 is next positioned in place with the left hand face of its outer margin, as viewed in the drawing, in contact with that portion of the ring 18' which will eventually form the left hand wall of the channel 20 and which thus forms a shoulder for engagement therewith. The member 48 which is relatively movable concentrically with respect to the member 38 is now moved to the left relative with respect to the other die parts, its end 50 moving into enclosing relation with respect to the portion 30' indicated in full lines in Fig. 6 and dotted lines in Fig. 8 until the shoulder 52 strikes the free edge of the portion 30' and the portion 24 is brought up against the right hand face of member 38. When this occurs continued relative movement of the die part 48 to the left will cause like movement of the die part 42 which, in turn, will cause the portion 24' to be drawn into the annular space provided therefor between the radially outer surface of the end 50 of the die part 48 and the wall of the opening 40, to provide the leg or flange 24, and the portion 30' will be bent by engagement with the shoulder 52 out of its axially extending position indicated in dotted lines in Fig. 8 to the radial position indicated at 30 in full lines into contact with the right hand surface of the outer margin of the backing plate 16 in which position it completes the formation of the channel 20. While the bending of the portion 24' and 30' occurs during a single continued movement of the various die members, it will be apparent that they are not necessarily bent simultaneously with each other and that by suitably modifying the die structure one may be caused to form in advance of the other, or both simultaneously as desired.

Preferably, spring means (not shown) are provided for resisting further relative movement of one of the die parts so that once the parts are brought to the position indicated in solid lines in Fig. 8, sufficient resistance is offered to further movement of one of the parts 42 and 48 to cause the wall portions of the channel 20 to be tightly compressed or crimped about the periphery of the backing plate 16 and thus insure a tight and efficient connection at this point which will obviate any possibility of rattling developed between the backing plate and the sealing element 18 as well as prevent the passage of foreign material through the joint between them.

After the movement of the die parts has been completed as above described their movements are reversed and brought back to their original positions which then permits the backing plate 16 and the sealing element 18 fixed thereto to be removed from the dies, after which the ring member 36 may be expanded and removed from the channel 22, thus leaving the assembly in completed condition and ready for suitable association with a brake drum.

Formal changes may be made in the specific embodiment of the invention described without departing from the spirit or substance of the broad invention, the scope of which is commensurate with the appended claims.

I claim:
1. The method of forming a brake drum backing plate and sealing ring assembly comprising, forming a backing plate having a circular periph- eral portion, coiling a strip of metal into cylindrical ring and welding the abutting edges thereof together, subjecting said ring to an initial forming operation, and acting upon said ring to crimp it to the periphery of said plate and simultaneously complete the forming of said ring by providing a channel offset from the periphery of said plate and extending in spaced relation with respect thereto.

2. The method of making a closure for a brake drum comprising, forming a disc part, partially forming a ring part, and finish forming said ring part and crimping a marginal edge portion only thereof about the periphery of said disc part to hold the remainder thereof in spaced relation to the disc part, in a single operation.

3. The method of forming a brake drum backing plate and seal assembly comprising, forming a backing plate having a generally circular peripheral edge, acting upon a cylindrical ring to provide a radially outwardly opening channel therein, one leg of which is shorter than the other and provided with an axially outwardly directed flange, placing said backing plate against the outer face of said shorter leg, and crimping said axially directed flange inwardly about the peripheral edge of said plate to clamp it in position against said face.

4. The method of forming a brake drum backing plate and seal assembly comprising, forming a backing plate having a generally circular peripheral edge, acting upon a cylindrical ring to provide a radially outwardly opening channel therein, one leg of which is shorter than the other and provided with an axially outwardly directed flange, placing said backing plate against the outer face of said shorter leg, crimping said axially directed flange inwardly about the peripheral edge of said plate to clamp it in position against said face, and bending the outer portion of the longer of said legs into hooded relation with respect to said channel.

5. The method of forming a brake drum backing plate and seal assembly comprising, a forming a backing plate having a generally circular peripheral edge, acting upon a cylindrical ring to provide a radially outwardly opening channel therein, one leg of which is shorter than the other and provided with an axially outwardly directed flange, placing said backing plate against the outer face of said shorter leg, and then crimping said axially directed flange inwardly about the peripheral edge of said plate to clamp it in position against said face, and bending the outer portion of the longer of said legs into hooded relation with respect to said channel in a single operation.

6. The method of forming a brake drum backing plate and seal assembly comprising, forming a backing plate having a generally circular peripheral edge, acting upon a cylindrical ring to provide a radially outwardly opening channel therein, one leg of which is shorter than the other and provided with an axially outwardly directed flange, placing said backing plate against the outer face of said shorter leg, and then simultaneously crimping said axially directed flange inwardly about the peripheral edge of said plate to clamp it in position against said face, and bending the outer portion of the longer of said legs into hooded relation with respect to said channel.

7. The method of forming a brake drum backing plate and seal assembly comprising forming a backing plate having a generally circular peripheral portion, coiling a sheet metal ring into an annulus having an axially directed cylindrical flange terminating at one edge in an inwardly directed shoulder and radially outwardly directed flange, placing said backing plate within said axially directed flange and against said shoulder, and then acting upon said plate and annulus to cause said axially directed flange to clamp said plate against said shoulder and a portion of said radially directed flange into axially directed relation.

8. The method of forming a sealing element for a brake drum comprising forming a hollow metallic cylindrical ring, operating upon said ring to provide a radially outwardly opening annular channel therein having one leg thereof radially extended and the other leg thereof provided at its free edge with an axially extending flange, and then acting upon said ring to form a portion of said radially extending leg into an axially extending flange and a portion of the first mentioned axially extending flange into a radially directed flange.

9. The method of forming a sealing element for a brake drum comprising forming a hollow metallic cylindrical ring, operating upon said ring to provide a radially outwardly opening annular channel therein having one leg thereof radially extended and the other leg thereof provided at its free edge with an axially extending flange, and then acting upon said ring to form a portion of said radially extending leg into an axially extending flange and a portion of the first mentioned axially extending flange into a radially directed flange reversely bent into spaced relation with respect to the corresponding of said legs.

10. The method of forming a sealing element for a brake drum comprising forming a hollow metallic cylindrical ring, operating upon said ring to provide a radially outwardly opening annular channel therein having one leg thereof radially extended and the other leg thereof provided at its free edge with an axially extending flange, and then acting upon said ring in a single operation to form a portion of said radially extending leg into an axially extending flange hooding said channel and to form a portion of the first mentioned flange into a radially extending flange disposed in reversely bent and spaced relation with the corresponding of said legs.

11. The method of forming a brake drum backing plate and shield assembly comprising, forming a backing plate having a generally circular peripheral edge, acting upon a cylindrical ring to provide a radially outwardly opening channel therein, one leg of which is provided with an axially outwardly directed flange, positioning said ring to bring a side of the channel thereof in contact with the peripheral margin of said plate with the periphery of said plate received within the area of said flange, crimping said flange over said peripheral margin to secure said ring and plate together, and bending the extremity of the other leg of said channel axially in the original direction of said flange.

12. The method of forming a brake drum backing plate and shield assembly comprising, forming a backing plate having a generally circular peripheral edge, acting upon a cylindrical ring to provide a radially outwardly opening channel therein, and acting upon one edge of said ring to crimp it to the periphery of said plate with the remainder of said ring extending in spaced relation thereto.

EMIL A. NELSON.